(12) United States Patent
Omori

(10) Patent No.: US 6,330,080 B1
(45) Date of Patent: *Dec. 11, 2001

(54) DATA COMMUNICATION APPARATUS, DATA COMMUNICATION METHOD, AND STORAGE MEDIUM

(75) Inventor: Seiji Omori, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,455

(22) Filed: Oct. 30, 1998

(30) Foreign Application Priority Data

Nov. 5, 1997 (JP) .................................... 9-319113

(51) Int. Cl.$^7$ ...................................... H04N 1/00
(52) U.S. Cl. ........................................... 358/407; 358/440
(58) Field of Search ...................... 358/400, 407, 358/440, 441; 379/100.05, 100.09

(56) References Cited

U.S. PATENT DOCUMENTS

| | | | | |
|---|---|---|---|---|
| 5,311,327 | * | 5/1994 | Fukushima et al. | 358/444 |
| 5,392,133 | * | 2/1995 | Nakajima | 358/407 |
| 5,852,500 | * | 12/1998 | Yoshino | 358/440 |
| 6,057,938 | * | 5/2000 | Abe et al. | 358/400 |

\* cited by examiner

*Primary Examiner*—Kimberly A. Williams
(74) *Attorney, Agent, or Firm*—Fitzpatrick, Cella, Harper & Scinto

(57) ABSTRACT

It is an object of this invention to provide a data communication apparatus which can prevent erroneous transmission of data to unrelated persons. When a plurality of addresses are set upon operation of an operation unit, information indicating that a plurality of addresses are set is displayed on a display unit to notify the operator of the information. No data is transmitted until the operator performs confirming operation to approve transmission of data to the plurality of addresses. When the operator performs confirming operation, a multi-address call is executed.

24 Claims, 3 Drawing Sheets

DATA COMMUNICATION APPARATUS, DATA COMMUNICATION METHOD, AND STORAGE MEDIUM

BACKGROUND OF THE INVENTION

1. Field of the Invention

The present invention relates to a data communication apparatus having the function of transmitting various data such as facsimile data, a data communication method, and a storage medium.

2. Related Background Art

A data communication apparatus having the function of transmitting the same data to two or more addresses, i.e., the multi-address call function, has been proposed. Especially, in recent years, operations in all data communication apparatuses tend to be simplified, and data communication apparatuses capable of making a multi-address call with simple operation have become mainstream.

In conventional data communication apparatuses, however, as the operation of setting a plurality of addresses is facilitated, the probability of operation errors increases. For this reason, when an operator makes an operation error, a plurality of addresses may be unintentionally set. As a result, data is sent to destinations other than intended destinations, causing troubles, or wasting communication expenses.

SUMMARY OF THE INVENTION

It is an object of the present invention to provide a data communication apparatus capable of preventing data from being erroneously sent to unrelated destinations, a data communication method, and a storage medium.

DETAILED DESCRIPTION OF THE PREFERRED EMBODIMENT

An embodiment of the present invention will be described below with reference to the accompanying drawings. The present invention will be described by exemplifying a facsimile apparatus for communicating image data, in particular, as a data communication apparatus.

Figure 1:
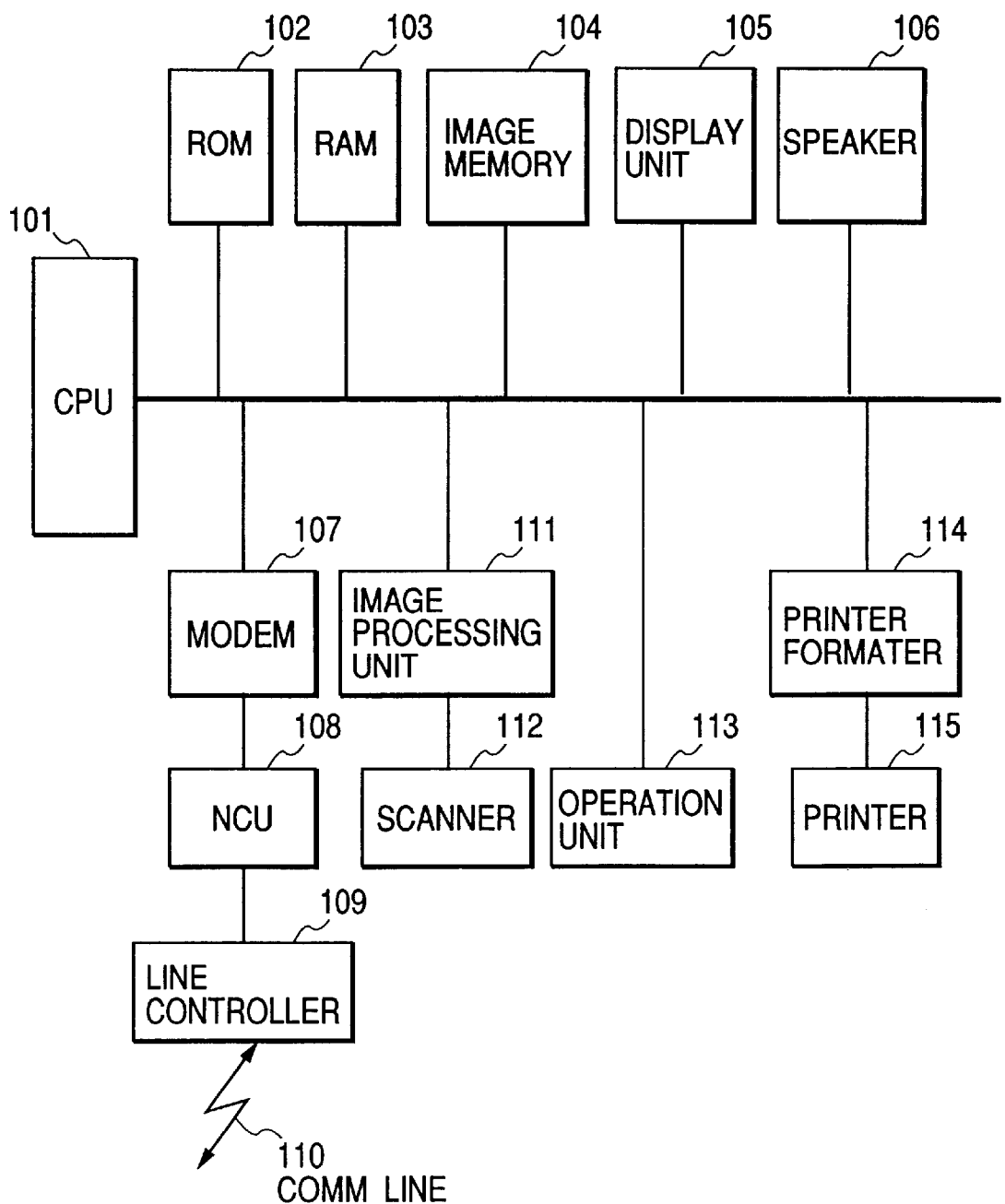
FIG. 1 is a block diagram showing the arrangement of a facsimile apparatus according to an embodiment of the present invention.

FIG. 1 is a block diagram showing the arrangement of a facsimile apparatus according to an embodiment of the present invention.

Referring to FIG. 1, a CPU 101 is a system controller for controlling the overall apparatus. A ROM 102 is used to store control programs for the CPU 101. A RAM 103 is composed of an SRAM for storing program control variables and the like. The transmission addresses (or destinations) and various set values registered by the operator, apparatus management data and the like, and various work buffers are also stored in the RAM. An image memory 104 is composed of a DRAM for storing image data.

A display unit 105 notifies the user of some information by displaying it using an LCD, LED, or the like. A speaker 106 notifies/warns the user of something by a sound and monitors a signal tone transmitted/received through a communication line 110. A MODEM 107 modulates/demodulates a signal transmitted/received to/from the facsimile. An NCU 108 has the function of sending a selection signal (dial pulse or tone dialer) to the communication line 110 through a line controller 109, and also performs automatic reception operation by detecting a ring tone.

An image processing unit 111 outputs high-resolution image data by performing correction processing for read image data. A scanner 112 is made up of a CS image sensor, an original convey mechanism, and the like. The scanner 112 optically reads an original and converts the read data into electrical image data.

An operation unit (or console unit) 113 is composed of a keyboard, a touch panel, or the like and is used by the operator to perform various input operations. A printer formatter 114 analyzes a printer description language and converts it into image data when file data from a workstation or the like is to be printed. A printer 115 is a device for recording a received image and file data on recording paper sheets.

Figure 2:
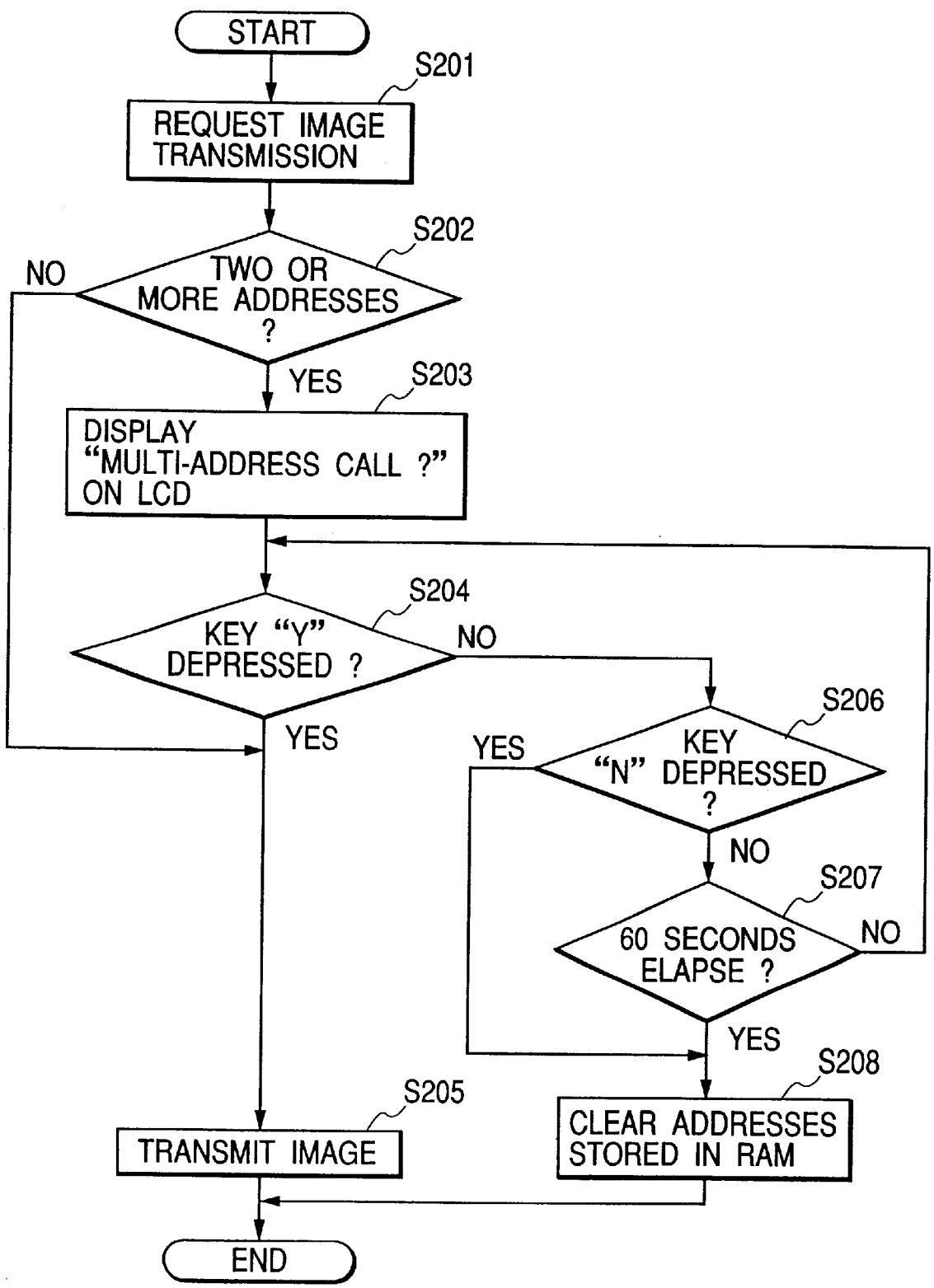
FIG. 2 is a flow chart showing the operation of the facsimile apparatus of the embodiment.

FIG. 2 is a flow chart showing an example of the operation of the facsimile apparatus according to the embodiment of the present invention.

When the operator is to transmit image data by using the facsimile apparatus of this embodiment, the operator operates the operation unit 113, starting from the initial state, to first set addresses (or destinations) to which the image data is to be transmitted. In this case, the operator can set a plurality of transmission addresses, and the set transmission addresses are stored in the RAM 103.

This operation includes setting addresses by using abbreviated dialing or one-touch dialing and setting addresses by designating a pre-registered multi-address call group, in addition to directly inputting dial numbers by operating a ten-key pad.

Upon setting one or more addresses, the operator sets a transmission image (original) on the scanner 112, and operates the operation unit 113 to send a transmission request to the apparatus (step S201).

After the transmission request is generated (step S201), it is determined whether the number of transmission addresses stored in the RAM 103 is two or more (step S202). If it is determined that the number of addresses is not two or more, i.e., one, the flow advances to a step of performing image transmission (step S205).

In this case, "image transmission" means a sequence of operations such as image data transmission, and line releasing call-outgoing. Assume that if no transmission image data is stored in the image memory 104 at the time of image transmission, image transmission step S205 also includes image data reading operation. In some case, for example, in a timer transmission mode or the like, image transmission step S205 may not be performed until it reaches a predetermined time or until a predetermined period of time elapses.

If it is determined in step S202 that the number of addresses is two or more, a message indicating the execution of a multi-address call like "MULTI-ADDRESS CALL?" or "NUMBER OF ADDRESSES=3" is displayed on the display unit 105 (step S203). In reply to this, if the "YES" key on the operation unit 113 is depressed (first operation) within 60 sec (step S204), the flow advances to the image transmission step (step S205) in which a multi-address call is performed to send the same image data to two or more addresses.

If the "NO" key on the operation unit 113 is depressed (second operation) (step S206) in response to the message displayed in step S203, the transmission addresses stored in the RAM 103 are erased (step S208), and the processing is terminated. If 60 sec elapse without depressing any of the "YES" and "NO" keys, the transmission addresses stored in the RAM 103 are erased (step S208), and the processing is terminated.

In this case, a transmission image is set on the scanner 112 after addresses are set. However, addresses may be set after a transmission image is set on the scanner 112. Alternatively, addresses may be set after a transmission image is read by the scanner 112.

Assume that it is determined in step S206 that the "YES" key is depressed, or it is determined in step S207 that 60 sec have elapsed. In this case, if transmission image data is stored in the image memory 104, the addresses in the RAM 103 are cleared in step S208, and the image data stored in the image memory 104 is cleared. The processing is then terminated.

Figure 3:
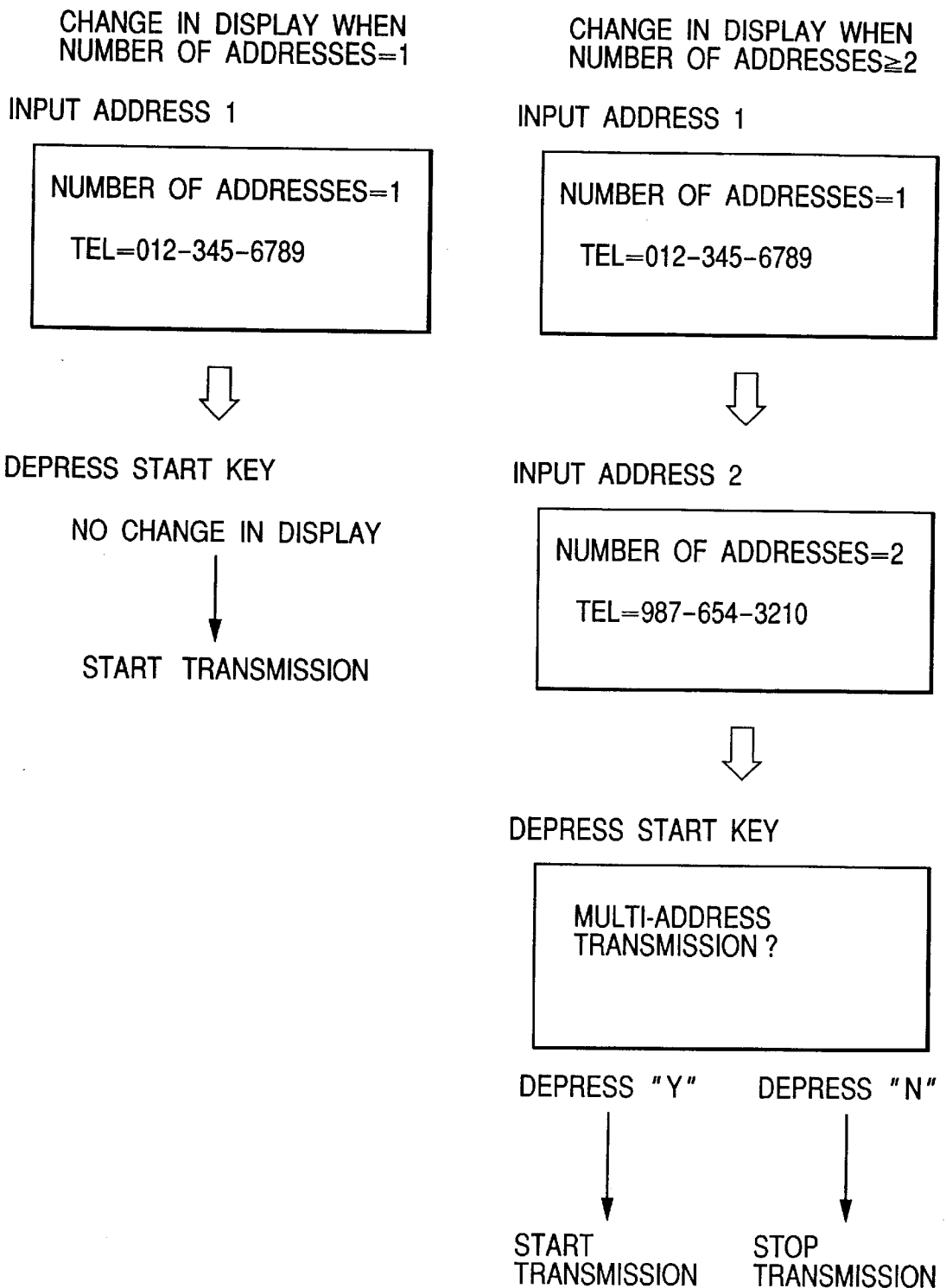
FIG. 3 is a view showing examples of displays according to the present invention.

FIG. 3 shows difference in displayed contents between the number of addresses=1 and the number of addresses=2 or more.

In this embodiment, the "YES" and "NO" keys are used as a key for approving the execution of a multi-address call and a key for refusing the execution of a multi-address call, respectively. However, for example, the start key, the set key, or the like may be used as a key corresponding to the "YES" key, and the stop key, the clear key, the reset key, or the like may be used as a key corresponding to the "NO" key.

As described above, the facsimile apparatus according to the embodiment of the present invention makes the operator determine whether a multi-address call is to be executed, when two or more addresses are set. This operation prevents execution of an unintentional multi-address call while maintaining ease of operation for a multi-address call.

The above operation is executed by the CPU 101 on the basis the programs stored in the ROM 102, the RAM 103, and the like. In the present invention, however, such programs may be stored in various external storage media such as a floppy disk, a hard disk, an optical disk, a magnetooptical disk, a CD-ROM, and a memory card, and the programs may be loaded into the facsimile apparatus through a dedicated reader. The CPU 101 then executes these programs.

The above embodiment has exemplified a standalone type facsimile apparatus. However, the present invention is not limited to this and can be applied to, for example, data communication control in a complex data processing system that combines, for example, a copying function, an electronic filing function, and a data processing function with a communication function. In addition, the present invention can be equally applied to a communication apparatus separated from reading and recording circuits and a data communication apparatus for performing a multi-address call of data, other than a facsimile apparatus.

As has been described above, according to the present invention, when a plurality of addresses are set, the operator is instructed to confirm the execution of a multi-address call. This can prevent the operator from erroneously performing a multi-address call, and hence can prevent transmission of data to unrelated persons against operator's intention. In addition, wasteful communication expenses and unnecessary operation of the apparatus can be minimized.

What is claimed is:

1. A data communication apparatus comprising:

operation means used by an operator to operate said apparatus;

display means for indicating a state of said apparatus to the operator;

address setting means for setting not less than one transmission address through operation of said operation means by the user;

transmission means for transmitting data to not less than one address set by said address setting means; and control means (1) for determining a number of addresses set by said address setting means, (2) when a determination result indicating that not less than two addresses are set, causing said display means to display information indicating a presence of not less than two addresses before causing said transmission means to transmit the data, and (3) causing said transmission means to perform a multi-address call of the data to not less than two addresses set by said address setting means in response to a predetermined operation conducted by the operator on said operation means after causing said display means to display the information indicating the presence of not less than two addresses.

2. An apparatus according to claim 1, further comprising storage means for storing data, wherein said transmission means transmits the data stored in said storage means.

3. An apparatus according to claim 2, wherein, when the operator performs the predetermined operation on said operation means after said control means causes said display means to display the information indicating the presence of not less than two addresses, said storage means starts storing transmission data afterward.

4. An apparatus according to claim 1, wherein, when a predetermined period of time elapses without the predetermined operation on said operation means being performed by the operator after said control means causes said display means to display the information indicating the presence of not less than two addresses, said control means erases the addresses set by said address setting means without causing said transmission means to transmit the data.

5. An apparatus according to claim 1, wherein, when the operator operates said operation means to stop transmission after said control means causes said display means to display the information indicating the presence of not less than two addresses, said control means erases addresses set by said address setting means without causing said transmission means to transmit the data.

6. An apparatus according to claim 2, wherein, when a predetermined period of time elapses without the predetermined operation on said operation means being performed by the operator after said control means causes said display means to display the information indicating the presence of not less than two addresses, said control means erases the transmission data stored in said storage means without causing said transmission means to transmit the data.

7. An apparatus according to claim 2, wherein, when the operator operates said operation means to stop transmission after said control means causes said display means to display the information indicating the presence of not less than two addresses, said control means erases the transmission data stored in said storage means without causing said transmission means to transmit the data.

8. An apparatus according to any one of claims 1 to 7, wherein the data is image data, and said data communication apparatus is a facsimile apparatus.

9. A data communication method of a data communication apparatus, said method comprising:

an operation step of an operator using operation means to operate the apparatus;

a display step of indicating, on a display, a state of the apparatus to the operator;

an address setting step of setting not less than one transmission address through operation of the operation means by the user;

a transmission step of transmitting data to not less than one address set in said address setting step; and a control step of (1) determing a number of addresses set in said address setting step, (2) when a determination result indicates that not less than two addresses are set, causisng said display step to display information indicating a presence of not less then two addresses before causing said transmission step to transmit the data, and (3) causing said transmission step to perform a mulit-address call of the data to not less than two addresses set in said address setting step in response to a predetermined operation conducted by the operator on the operation means after causisng said display step to display the information indicating the presence of not less than two addresses.

10. A method according to claim 9, further comprising a storage step of storing data, wherein said transmission step transmits the data stored in said storage step.

11. A method according to claim 10, wherein, when the operator performs the predetermined operation on the operation means after said control step causes said display step to display the information indicating the presence of not less than two addresses, said storage step starts storing transmission data afterward.

12. A method according to claim 9, wherein, when a predetermined period of time elapses without the predetermined operation of the operation means being performed by the operator after said control step causes said display step to display the information, indicating the presence of not less than two addresses, said control step erases addresses set in said address setting step without causing said transmission step to transmit the data.

13. A method according to claim 9, wherein, when the operator operates the operation means to stop transmission after said control step causes said display step to display the information indicating the presence of not less than two addresses, said control step erases addresses set in said address setting step without causing said transmission step to transmit the data.

14. A method according to claim 10, wherein, when a predetermined period of time elapses without the predetermined operation on the operation means being performed by the operator after said control step causes said display step to display the information indicating the presence of not less than two addresses, said control step erases the transmission data stored in said storage step without causing said transmission step to transmit the data.

15. A method according to claim 10, wherein, whenein, when the operator operates the operation means to stop transmission after said control step causes said display step to display the information indicating the presence of not less than two addresses, said control step erases the transmission data stored in said storage step without causing said transmission step to transmit the data.

16. A method according to any one of claims 9 to 15, wherein the data is image data, and the data communication apparatus is a facsmile apparatus.

17. A computer program product embodying a program for implementing a data communication method of a data communication apparatus, the program comprising;

code for an operation step in which an operator uses operation means to operate the apparatus;

code for a display step of indicating, on a display, a state of the apparatus to the operator;

code for address setting step of setting not less than one transmission address through operation of the operation means by the user;

code for a transmission step of transmitting data to not less than one address set in the address setting step; and code for a control step of (1) determing a number of addresses set in the address setting step, (2) when a determination result indicates that not less than two addresses are set, causing the display step to display information indicating apresence of not less than two addresses before causing the transmission step to transmit the data, and (3) causing the transmission step to perform amulti-address call of the data to not less than two addresses set in the address setting step in response to a predetermined operation conducted by the operator on the operation means after causing the display step to display the information indicating the presence of not less than two addresses.

18. A program product according to claim 17, wherein the program further comprises code for a storage step of storing data, and wherein the transmission step transmits the data stored in the storage step.

19. A program product according to claim 18, wherein, when the operator performs the predetermined operation on the operation means after the control step causes the display step to display the information indicating the presence of not less than two addresses, the storag step starts storing transmission data afterward.

20. A program product according to claim 17, wherein, when a predetermined period of time elapses without the predetermined operation on the operation means being performed by the operator after the control step causes the display step to display the information indicating the presence of not less than two addresses, the control step erases addresses set in the address setting step without causing the transmission step to transmit the data.

21. A program product according to claim 17, wherein, when the operator operates the operation means to stop transmission after the control step causes the display step to display the information indicating the presence of not less than two addresses, the control step erases addresses set in the address setting step without causing the transmission step to transmit the data.

22. A program product according to claim 18, wherein, when a predetermined period of time elapses without the predetermined operation on the operation means being performed by the operator after the control step causes the display step to display the information indicating the presence of not less than two addresses, the control step erases the transmission data stored in the storage step without causing the transmission step to transmit the data.

23. A program product according to claim 18, wherein, when the operator operates the operation means to stop transmission after the control step causes the display step to display the information indicating the presence of not less dthan two addresses, the control step erases the transmission data stored in the storage step without causing the transmission step to transmit the data.

24. A program product according to any one of claims 17 to 23, wherein the data is image data, and the data communication apparatus is a facsimile apparatus.

* * * * *

UNITED STATES PATENT AND TRADEMARK OFFICE
CERTIFICATE OF CORRECTION

PATENT NO. : 6,330,080 B1
DATED : December 11, 2001
INVENTOR(S) : Seiji Omori

Page 1 of 1

It is certified that error appears in the above-identified patent and that said Letters Patent is hereby corrected as shown below:

Drawings,
Sheet 1, Fig. 1, "FORMATER" should read -- FORMATTER --.

Column 2,
Line 53, "case," should read -- cases, --.

Column 3,
Line 21, "difference" should read -- differences --.
Line 41, "basis" should read -- basis of --.
Line 44, "magnetoop-" should read -- magneto-op --.
Line 48, "has" should read -- have --.

Column 4,
Line 40, "the" should be deleted.

Column 5,
Line 14, "causisng" should read -- causing --.
Line 17, "mulit-" should read -- multi- --.
Line 55, "whenein," should be deleted.
Line 67, "comprising;" should read -- comprising: --.

Column 6,
Line 5, "address" should read -- an address --.
Line 10, "determing" should read -- determining --.
Line 15, "apresence" should read -- a presence --.
Line 18, "amulti-address" should read -- a multi-address --.
Line 60, "dthan" should read -- than --.

Signed and Sealed this

Seventh Day of May, 2002

*Attest:*

JAMES E. ROGAN
*Attesting Officer*  *Director of the United States Patent and Trademark Office*